United States Patent
Draht et al.

(10) Patent No.: US 8,375,549 B2
(45) Date of Patent: Feb. 19, 2013

(54) METHOD FOR ESTABLISHING A NAIL CONNECTION BETWEEN TWO NON-PREPUNCHED COMPONENTS

(75) Inventors: Torsten Draht, Bielefeld (DE); Gerson Meschut, Bielefeld (DE)

(73) Assignee: Bollhoff Verbindungstechnikk GmbH (DE)

( * ) Notice: Subject to any disclaimer, the term of this patent is extended or adjusted under 35 U.S.C. 154(b) by 1218 days.

(21) Appl. No.: 11/994,295

(22) PCT Filed: Jan. 16, 2007

(86) PCT No.: PCT/EP2007/000339
§ 371 (c)(1),
(2), (4) Date: Dec. 28, 2007

(87) PCT Pub. No.: WO2007/082714
PCT Pub. Date: Jul. 26, 2007

(65) Prior Publication Data
US 2008/0222873 A1 Sep. 18, 2008

(30) Foreign Application Priority Data

Jan. 17, 2006 (DE) .......................... 10 2006 002 238

(51) Int. Cl.
*B23P 11/00* (2006.01)
*F16B 15/00* (2006.01)
*F16B 15/02* (2006.01)
(52) U.S. Cl. ..... 29/432; 29/432.1; 29/432.2; 29/525.01; 29/798; 29/818; 411/493; 411/923
(58) Field of Classification Search ............ 29/432, 29/432.1, 432.2, 524.1, 525.01, 525.11, 818, 29/798; 411/494, 498, 451.3, 440, 455, 493, 411/923
See application file for complete search history.

(56) References Cited

U.S. PATENT DOCUMENTS

| 2,207,897 | A | * | 7/1940 | Schaus | ............................. 52/513 |
| 3,505,919 | A | | 4/1970 | Batliner | |
| 3,835,991 | A | * | 9/1974 | Brecht | ........................... 206/343 |
| 4,002,098 | A | * | 1/1977 | Colechia | ....................... 411/443 |

FOREIGN PATENT DOCUMENTS

| DE | 1707412 U | 8/1955 |
| DE | 1707412 | 9/1955 |
| DE | 1773599 U | 4/1956 |
| DE | 1019869 B | 4/1958 |

(Continued)

OTHER PUBLICATIONS

Allgemeine bauaufsichtliche Zulassung mit der Zulassungsnummer Z-14.4-456 vom Nov. 21, 2005 (general building inspection admission having the admission No. Z-14.4-456,10 pgs ).

(Continued)

*Primary Examiner* — Jermie Cozart
(74) *Attorney, Agent, or Firm* — Seyfarth Shaw LLP

(57) ABSTRACT

A method is described for establishing a nail connection between two components as well as a nail therefor. The nail is driven through the non-prepunched components in the joining area at a high speed such that the nail tip fully penetrates both components and forms a toric-shaped material bulge in the nail-head-side component, which protrudes into a circular groove of the nail head, and a crater-shaped material bulge is formed in the component facing away from the nail head, which protrudes in the opposite direction.

29 Claims, 5 Drawing Sheets

FOREIGN PATENT DOCUMENTS

| | | |
|---|---|---|
| DE | 1940447 | 2/1971 |
| DE | 1940447 A | 2/1971 |
| DE | 1575152 | 7/1971 |
| DE | 1575152 B | 7/1971 |
| DE | 72 26 710 U | 8/1973 |
| DE | 7226710 U1 | 8/1973 |
| DE | 2250912 A1 | 5/1974 |
| DE | 1500770 B2 | 7/1976 |
| DE | 3909725 C1 | 9/1990 |
| DE | 3922684 A1 | 1/1991 |
| DE | 19637969 C2 | 4/2000 |
| DE | 10248427 A1 | 5/2004 |
| DE | 10 2004 040701 B3 | 7/2005 |
| DE | 20 2006 000666 U1 | 4/2006 |
| EP | 0338973 A2 | 3/1989 |
| EP | 1 253 332 A2 | 4/2002 |
| GB | 1 275 202 | 5/1972 |
| GB | 1 479 600 A | 7/1977 |
| GB | 1479600 | 7/1977 |
| JP | 48-2920 | 1/1973 |
| JP | 54-82859 | 6/1979 |
| JP | 61-104814 | 7/1986 |
| JP | 6-213220 | 8/1994 |
| JP | 7-8614 | 2/1995 |
| JP | 10-339312 | 12/1998 |
| JP | 2001-3910 | 1/2001 |
| JP | 2001-124030 | 5/2001 |
| JP | 2003-322122 | 11/2003 |

OTHER PUBLICATIONS

Bedienungsanleitung Spitfire P525L, hier insbesondere Seite 29 oben (instruction manual spitfire P525L, her in particular top of p. 29, 11pgs).

Bolzensetzen von Stahl-und Aluminiumwerkstoffen Nov. 2000, hier insbesondere Seite 49, Bild 3 und Seite 50 Bild 4; (research report AIF No. 11,659 N DVS No. 5.014, bolt setting of steel and and aluminum materials of Nov. 2000. 100 pgs).

Dissertation Paderborn 2005, Hahn, O.: Entwicklung des Bolzensetzens fur Blech-Profil-Verbindungen in Fahrzeugbau (dissertation Paderborn 2005, Hahn, O.-development of bolt setting for sheet profile connections in vehicle construction, 5 pgs).

VHT Forschungsvorhaben Nr. S 619, Untersuchung der Befestigungstechnik mit ballistischen Verbingdungsmitteln zur rationellen Erstellung tragender Tafelelemente in Stahlprofil Leichtbauweise (VHT research project No. S 619, exam. of fastening technology.

Schweissen & Schneiden, Speed of Light, Sep. 2001 brochure.

Deutsches Institut Fur Bautechnik, Bescheid, Industrieverband zur Forderung des Bauens mit Stahlblech e.V. (IFBS), Jul. 31, 2005.

Tabelle 1, Besondere Anwendungsfalle, Blatt 1.

Direktmontagetechnik, Sonderdruck aus BMT Baumaschine+Bautechnik May 1995, Hilti.

Bauingenieur 63 (1988) 63-66, Korrosionssichere Profilblechbefestigungen durch denEinsatz von Direktmontagreelementen.

DX Problemloser—Stahl, Hilti Printed in Liechtenstein 1999.

DX Produkte Information C3, Hilti, Ausgabe Jan. 2004.

Hilti DX76 manual.

Produkte/Service May 2004, Hilti.

Deutsches Institut Fur Bautechnik, Bescheid, Industrieverband zur Forderung des Bauens mit Stahlblech e.V. (IFBS), Jul. 31 2005.

Tabelle 1, Besondere Anwendungsfalle, Blatt 1, Jul. 1990.

* cited by examiner

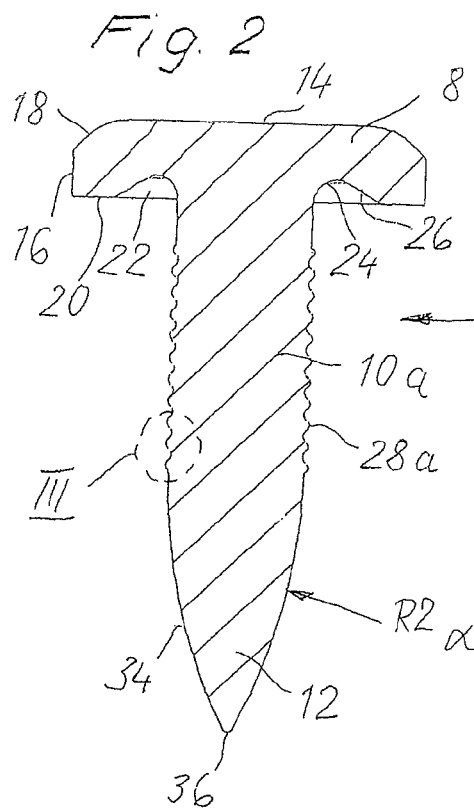
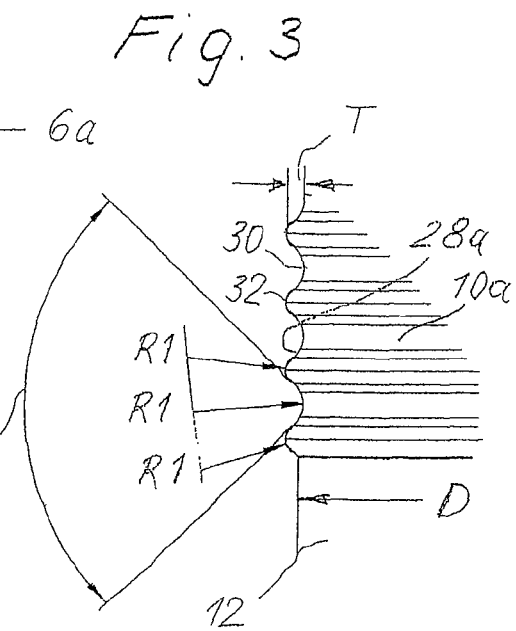
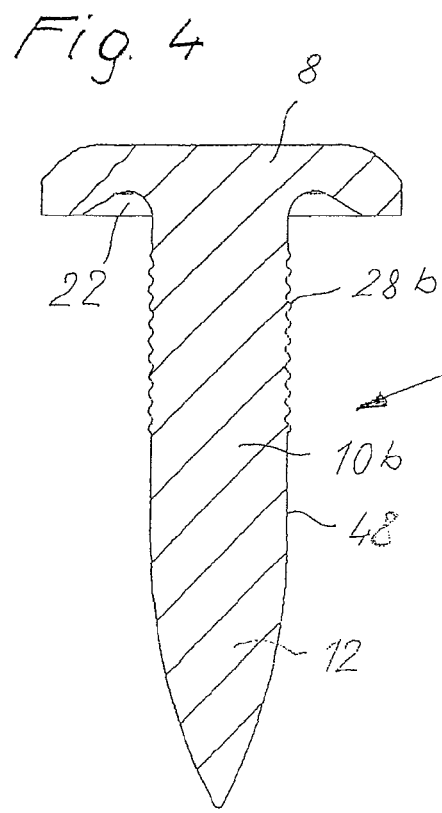
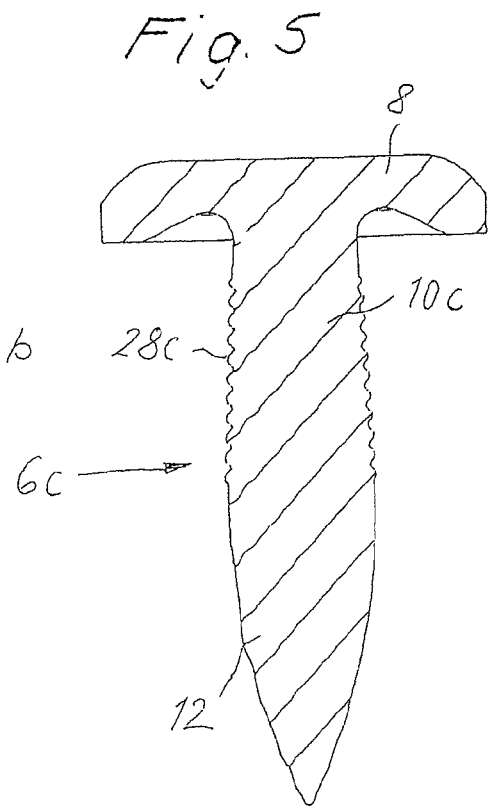

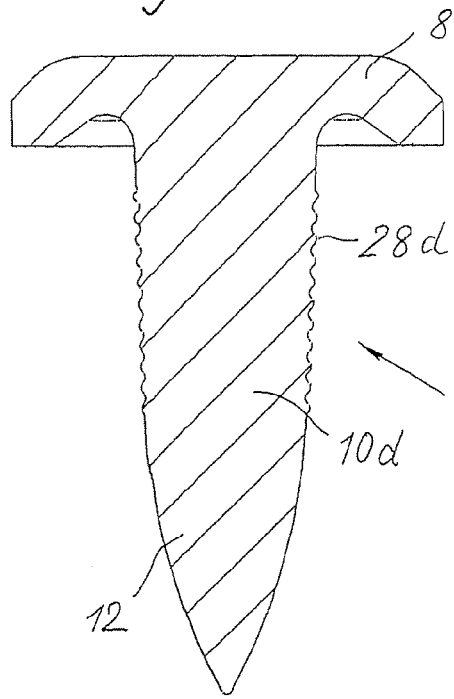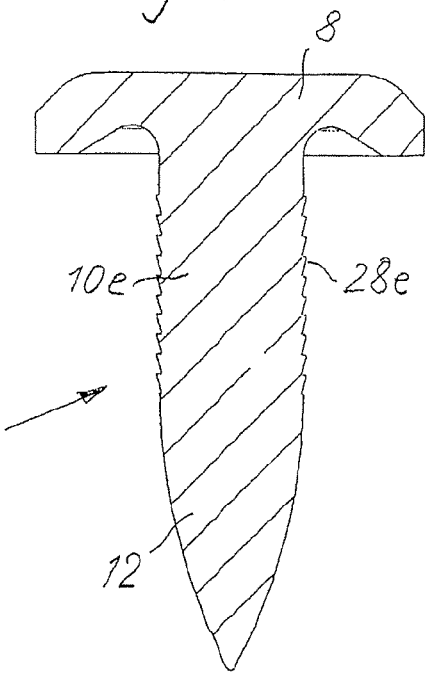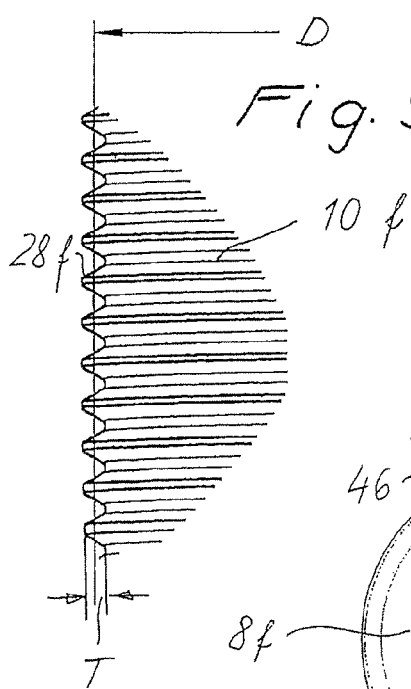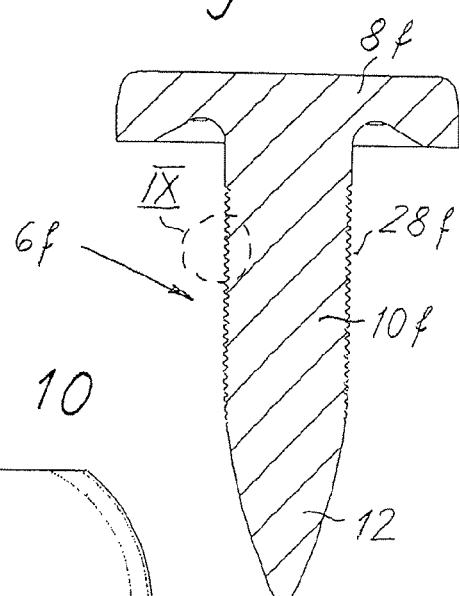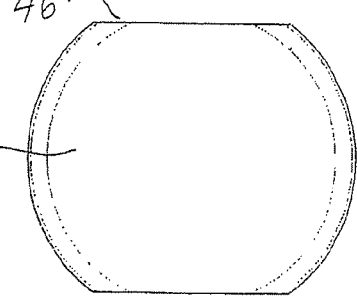

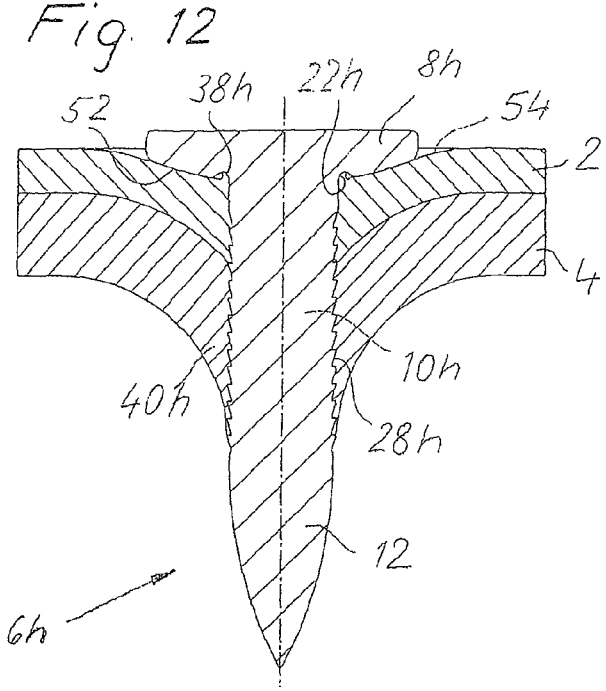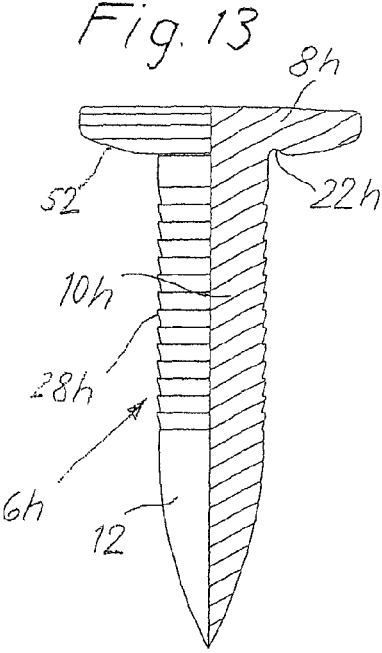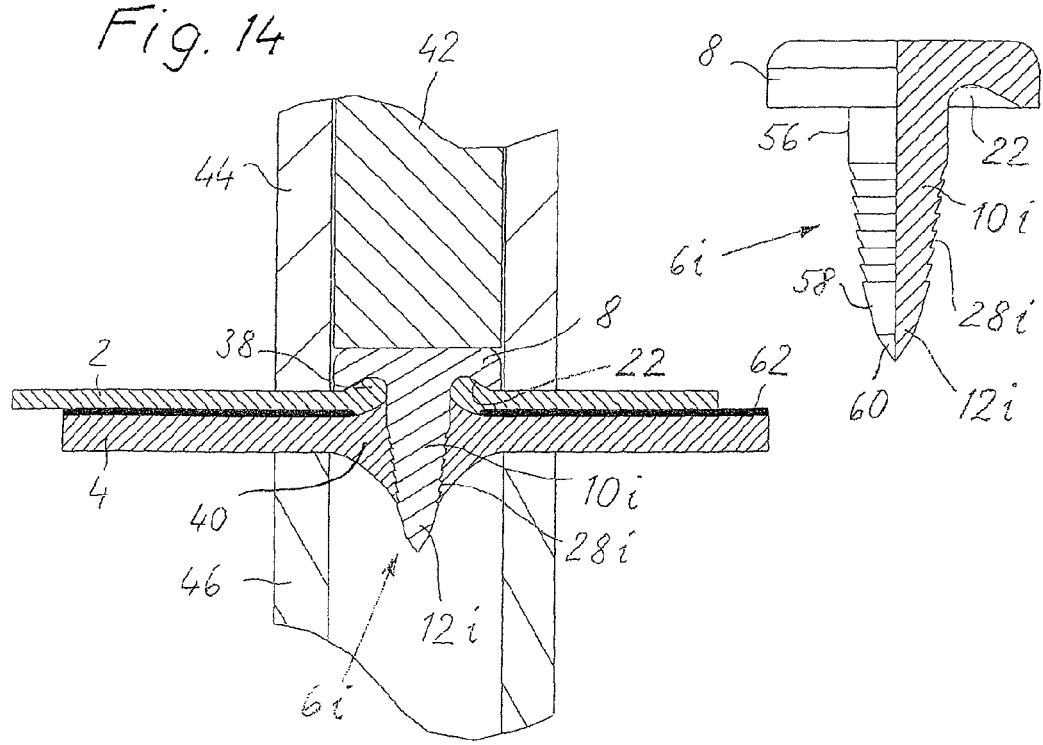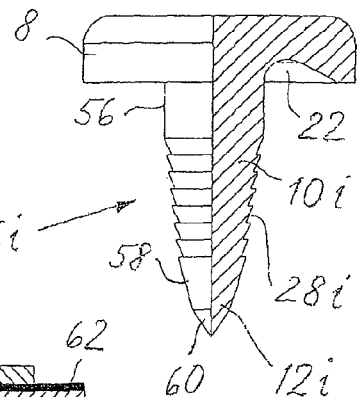

METHOD FOR ESTABLISHING A NAIL CONNECTION BETWEEN TWO NON-PREPUNCHED COMPONENTS

This application is a U.S. National Phase of International Patent Application Serial No. PCT/EP2007/000339, filed Jan. 16, 2007 which claims priority to German Patent Application No. 10 2006 002 238.6 filed Jan. 17, 2006.

FIELD OF THE INVENTION

The present invention relates to a method for establishing a nail connection between two components by means of a nail, which is driven into the components by a setting device at a high speed, as well as a nail therefor.

BACKGROUND OF THE INVENTION

This method, also known under the term "bolt setting," is a reshaping joining method, in which a nail (bolt) is driven into the components to be joined at a high speed. It has the advantage that one-sided accessibility of the joining area is generally sufficient and pre-punched hole operations can often be avoided. Bolt setting is already being used as a reliable joining method in many areas like steel construction, facade construction, metal construction, ship building and the construction industry.

Nails (setting bolts), which are driven into steel, iron, sheet metal and similar metallic substances by means of setting devices in the form of powder force-driven cartridges, are known for example from DE 1 575 152, 1 940 447, 1 500 770. This type of nail normally consists of a nail head, nail shaft and an ogival nail tip, wherein the shaft can be provided with a surface profiling in the form of cross or arrow edgings, helically running ribbings and suchlike.

A nail (bolt) with a flat head, a cylindrical shaft and an ogival nail tip, which serves to fasten sheet metal plates on a metal part that is thicker than the sheet metal plate, is known from DE-GM 72 26 710. The nail is shot into the metal part through a prefabricated hole in the sheet metal plate. A recess for receiving the material protruding from it during the shooting into the metal part is provided in the head and/or in the shaft of the nail. In accordance with one embodiment in this document, the recess is provided on the bottom side of the nail head so that the edge of the sheet metal plate surrounding the prefabricated hole is bent up into the recess by the displaced material of the metal part. The metal part, the thickness of which is considerably larger than the length of the nail, completely surrounds the nail tip. The method disclosed in this document serves above all to fasten type plates to machines. This joining method is not suitable for fastening sheet metal plates to extruded sections with a closed cross-section or to components that have been reshaped through high internal pressure, as required for example in automobile manufacturing.

A joining method suitable for this application purpose is for example the so-called direct screwing, also known as "Flow Drilling Screw (FDS)." This method (see e.g. DES 102 48 427 A1, D139 22 684 A1 DE 39 09 725 C1 and DE 196 37 969 C2) uses a screw that has a flat screw head, a screw shaft provided with a thread and a screw tip. The screw is first placed on the components to be joined with a high speed and a corresponding contact force. The thus occurring frictional heat plasticizes the joining component substance to be reshaped. Crater- or toric-shaped appendages are thereby formed against and in the feed direction, into which the screw thread furrows out a counter-thread. The screw-in procedure is complete when the screw has penetrated the components and the screw head hits the upper component.

SUMMARY OF THE INVENTION

The object of the present invention is to create a method for establishing a connection between two components by means of a nail driven in at a high speed and a nail therefore which can be used in the case of one-sided accessibility of the components, does not require the prepunching of holes in the components, enables above all a short-term joining process without rotational movement of the nail and leads nonetheless to a high quality connection.

The method according to the invention uses a nail, which has a nail head with a circular groove provided on the bottom side of the head, a nail shaft and a nail tip. The nail is driven mainly free of rotation and axially into the non-prepunched components in the joining area at a high speed by a setting device such that the nail tip fully penetrates both components and escapes over the component facing away from the nail head and a toric-shaped material bulge is formed in the nail-head-side component, which protrudes into the circular groove of the nail head and a crater-shaped material bulge is formed in the component facing away from the nail head, which protrudes in the direction facing away from the nail head.

The volume of the circular groove preferably mainly matches the volume of the material bulge of the nail-head-side component so that the circular groove is completely filled by the material bulge.

The nail shaft, which can be designed cylindrically or also convergent or divergent in the direction of the nail head, is preferably provided with a surface profiling, which is filled with displaced material during the joining process.

The components can be made of steel, aluminum, magnesium or plastic with or without fiber content. The nail is preferably made of steel, in particular a tempered steel, but can also be made of aluminum, magnesium, brass, ceramic or fiber-reinforced plastic.

The method according to the invention is characterized by great simplicity and extremely low joining time, since a prepunching of the components is not required and the nail is driven into and through the two components in one single joining process at a high speed without a rotational movement. As corroborated in experiments, the connection between the two components established in this manner is characterized by a high connection quality. Another advantage of the method according to the invention is that two-sided accessibility of the joining area is not required if the component facing away from the nail head is sufficiently rigid.

In the case of another embodiment according to the invention, a nail in the form of a staple bolt is used, which has a nail head with a circular groove provided on the bottom side of the head, a nail shaft with a sawtooth profiling and a nail tip. The nail is driven mainly free of rotation and axially into the non-prepunched components in the joining area at a high speed by a setting device such that the nail tip penetrates the nail-head-side component and enters the component facing away from the nail head and that a toric-shaped material bulge is formed in the nail-head-side component, which protrudes into the circular groove of the nail head, and a crater-shaped material bulge is formed in the component facing away from the nail head, which protrudes in the direction facing away from the nail head. The sawtooth profiling is preferably aligned such that each saw tooth tapers toward the nail tip.

With this embodiment of the invention, a relatively thin component can be "fastened" to a relatively thick component by means of a staple bolt with small dimensions in order for example to let an adhesive layer between the two components harden. A complete or even just partial penetration of component facing away from the nail head is hereby possible.

Further advantageous embodiments and further developments of the invention arise from the dependent claims.

BRIEF DESCRIPTION OF THE DRAWINGS

Exemplary embodiments of the invention are explained in greater detail based on the drawings.

FIG. 2 shows a longitudinal section through the nail in FIG. 1;

FIG. 3 shows an enlarged view of one detail labelled with III in FIG. 2;

FIGS. 4 through 8 show longitudinal sections in accordance with FIG. 2 of a modified embodiment of the nail according the invention;

FIG. 9 shows an enlarged view of one detail labelled with IX in FIG. 8;

FIG. 10 shows a view from the top of the nail head of the nail in FIG. 8;

FIG. 12 shows a cut view of a connection between two components by means of a nail of another embodiment of the invention;

FIG. 13 shows a partially cut side view of the nail from the connection in FIG. 12;

FIG. 14 shows a cut view of a connection between two components by means of a nail with parts of the establishing device according to a modified embodiment of the invention;

FIG. 15 shows a partially cut side view of the nail of the connection in FIG. 14.

DETAILED DESCRIPTION OF A PREFERRED EMBODIMENT OF THE INVENTION

Figure 1:
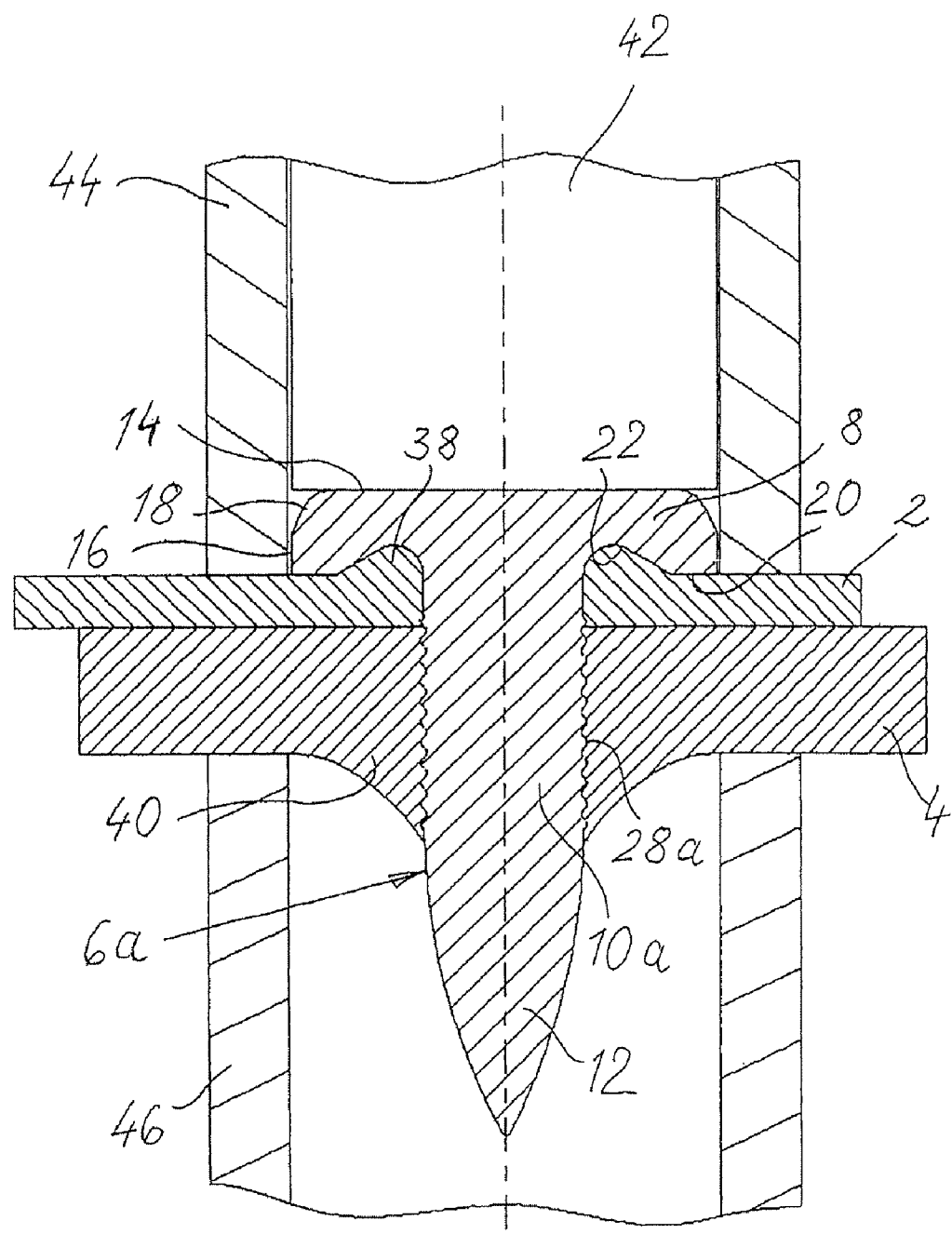
FIG. 1 shows a partially cut view of a connection between two components by means of a nail established with the method according to the invention with parts of the establishing device.

FIG. 1 shows a finished connection between a component 2 and a component 4 by means of a nail 6*a*. In the exemplary embodiment shown, the component 2 is a thin-walled component in the form of a sheet metal plate, and the component 4 is a component with a larger wall thickness, which is for example a profile component. They can for example be body parts for automobile manufacturing, while the invention is not restricted to this.

The components 2, 4 can be made of steel, aluminum, magnesium or plastic with or without fiber content. They are not prepunched before the joining process, as will be explained in greater detail.

As can be seen in FIGS. 1 and 2, the nail 6*a* consists of a nail head 8, a nail shaft 10*a* and a nail tip 12.

The nail head 8 is a flat head with an even top side 14, a cylindrical circumferential surface 16 and an even bottom side 20, in which a circular groove 22 is formed adjacent to the nail shaft 10*a*. The circular groove 22 has a rounded circumferential surface 24, which on one side passes tangentially into the nail shaft 12 and on the other side tangentially into a conical surface 26.

The nail shaft 10*a* is designed mainly cylindrically in the exemplary embodiment in FIGS. 1, 2 and is provided with a surface profiling 28*a* in a certain area of its surface. As can be seen in particular in FIG. 3, the surface profiling 10*a* in the exemplary embodiment shown consists of a series of circular recesses 30 and ridges 32. The surface profiling 28*a* thus has a rounded wave-like profile in axial sections, which is designed in a sinusoidal manner in the exemplary embodiment shown. The radii of the recesses 30 and ridges 32 labeled with R1 in FIG. 3 are thus identical. The angle α between the flanks of the ridges 32 is hereby on the order of magnitude of 90°.

As shown, the surface profiling 28*a* only has a relatively low depth. The ratio of the depth T of the surface profiling 28*a* to the average shaft diameter D is preferably less than 0.1 and in particular less than 0.05. This ratio is for example on the order of magnitude of 0.03.

The nail tip 12 has an ogival surface 34 with a rounded end point 36. The ogivality factor, i.e. the ratio of the radius R2 to the shaft diameter D of the ogival surface 34, is e.g. on the order of magnitude of 2 to 6, preferably in the range of 3 to 5 and is in particular approximately 4.

The nail 6*a* including the head, shaft and tip is designed rotationally symmetrical, which also applies to the exemplary embodiments in FIGS. 4 through 7 and 11.

The nail 6*a* is preferably made of steel. However, depending on the application, it can be made of aluminum, magnesium, brass, ceramic or fiber-reinforced plastic. In the exemplary embodiment shown, the nail 6*a* is uncoated; it can however also be coated.

As shown, the nail 6*a* is designed as one single piece. However, it is generally also possible to produce the nail head on one hand and the nail shaft with the nail tip on the other hand from two parts with different hardnesses, which are then connected together. Thus, for example, the nail shaft with the tip can be made of metal and the nail head can be made of aluminium, which are then combined by means of friction welding.

The method for establishing the connection shown in FIG. 1 between the components 2 and 4 by means of nail 6*a* will now be described:

As already mentioned, the components 2 and 4 cannot be prepunched before the joining process. If both components 2 and 4 are adjacent to each other, the nail 6*a* is driven from above into the two components 2 and 4 by a setting device at a high speed. The setting speed depends on the application case and lies e.g. between 5 and 300 m/s, preferably 10 and 100 m/s.

The bolt setting device is for example a bolt shooting device, a powder-force-driven cartridge or suchlike. FIG. 1 shows a piston 42 of this type of setting device. Furthermore, the mouthpiece 44 of a hold-down device that is not shown in greater detail can also be seen.

As already mentioned, the method according to the invention can be performed in the case of just one-side accessibility of the joining location. However, if the component 4 does not have sufficient rigidity, a counterholder in the form of a sleeve 46 should be provided, on which the components 2, 4 are supported.

During the joining process, the nail tip 12 first enters the component 2. This leads to a material bulge on the top side of the component 2, which grows as the nail tip 12 enters the component 2.

The nail tip 12 then penetrates through the lower component 4. This leads on one hand to a crater-shaped material bulge 40, which becomes larger in the drive direction during the penetration of the nail tip 12. On the other hand, material flows into the surface profiling 28*a*, whereby the recesses in the surface profiling 28*a* are completely filled with material 4.

This preferably concerns material of the component 4. However, it can sometimes not be prevented that the recesses of the surface profiling 28a fill at least partially with material of the component 2.

The joining process is complete when the bottom side of the nail head 8 rests on the top side of the component 2. The nail head 8 is designed such that it has a certain flexibility in order to avoid crack formation under the nail head and to be able to counterbalance slight inclinations of the nail. If the setting stamp 42 is released from the nail head 8, the nail 6a springs back slightly. The components 2, 4 are hereby tensioned together, which benefits the connection quality.

The volume of the circular groove 22 mainly matches the volume of the material bulge 38, so that the circular groove 38 is completely filled with the material of the component 2. In the case of body shell applications, in which the component 2 is provided with a coating (paint or cathodic lacquer), there can thus be no bubble formation by the trapped air.

As shown, the surface profiling 28a is only provided in the area of the nail shaft 10a that is located within the substance of the component 4 in the case of the finished connection. In this manner, a connection with high extraction resistance is created, since the components 2, 4 are tensioned together on one hand through frictional and form closure between the nail shaft 10a and component 4 and on the other hand through form closure between the nail head 8 and component 2. As shown, the components 2 and 4 remain mainly undeformed in the separation plane so that the evenness of the contact surfaces of the components 2 and 4 is retained. As can also be seen in FIG. 1, the nail tip 12 mainly projects fully out of the component 4.

As can easily be seen, the joining process only requires accessibility from the top side. The joining process is extremely simple, since neither a prepunching of the components 2, 4 nor a rotational movement of the nail 6a is required. The joining time is extremely short. Moreover, only comparably low joining forces are required. Nonetheless, a high connection quality with correspondingly high extraction resistance results.

As was also shown, the rounded shape of the surface profiling 28a leads to comparatively low tensions in the connection between the components 2, 4 and the nail 6a, which accordingly contributes to the connection quality.

As can be seen in FIG. 1, the surface of the nail head 8 extends almost up to the outer edge (circumferential surface 16) of the nail head 8. Only a relatively small rounding or bevel 18 is provided between the evenly designed top side 14 and the circumferential surface 16 so that the piston 42 on the nail head 8 mainly engages over its entire width.

If the bolt tip 12 enters the components 2, 4, the largest part of the setting force of the piston 42 is transferred to the central area of the nail head 8 so that correspondingly high tensions are created in the central area of the nail head 8. If the nail head 8 is set on the top side of the component 2 at the end of the setting process, the largest part of the setting force is transferred from the piston 42 to the radially exterior area of the nail head 8 and from there over the outer surface of the bottom side 20 to the components 2, 4, while the central area of the nail head 8 is decompressed.

The setting forces exerted by the piston 42 are thus not fed to the nail shaft 10a. In this manner, it is avoided that the placement of the nail 6a on the component 2 leads to a "puncture," even if the setting process itself was operated with excess energy. In the case of the so-called "penetration," the nail head 8 enters the component 2 and a crack also forms between the surface profiling 28a of the nail shaft 10a and the hole in the component 4.

The hold-down device 44 serves above all to push the components 2 and 4 against each other before and during the setting process. Hold-down forces of less than 3 kN are generally sufficient here. Higher hold-down forces for the manipulation of the material properties of the components 2 and 4 are not generally required.

The counterholder in the form of the sleeve 46 is, as already mentioned, only required if the component 4 is not sufficiently rigid.

Based on FIGS. 2 through 10, different embodiments of the nail are described, which can be used in the method according to the invention.

The nail 6b in FIG. 4 is different from the nail 6a in FIG. 2 only in that a cylindrical section 48 is provided between the nail tip 12 and the part of the nail shaft 10b provided with the surface profiling 28b, whereby the nail shaft 10b receives a correspondingly longer length. The longer nail shaft 10b benefits the tension release phase after the nail tip enters the components, whereby deformations of the components are reduced.

The nail 6c in FIG. 5 is different from the nail 6a in FIG. 2 only in that the nail shaft 10a has a mainly conical shape, which converges from the nail tip 12 in the direction of the nail head 8. The surface profiling 28c is hereby modified to the conical form of the nail shaft 10c such that its depth remains mainly constant. This "waisting" of the nail shaft 10c permits the reaching of a higher extraction resistance of the connection.

In the case of the nail 6d in FIG. 6, the nail shaft 10d with the surface profiling 28d is also designed mainly conically, however such that it runs divergent from the nail tip 12 in the direction of the nail head 8. A well tensioned arrangement and an improved tiling of the surface profiling 28b are hereby achieved.

The nail 6e in FIG. 7 has a mainly cylindrical nail shaft 10e with a surface profiling 28e, which is designed in a sawtooth-like manner in longitudinal sections. This permits the achievement of a higher extraction resistance, the trade-off of which however must be the higher tensions in the connection.

The nail 6f in FIGS. 8 through 10 is provided with a surface profiling 28f in the form of a thread. The thread, which is shown enlarged in FIG. 9, is designed as a fine thread, the incline of which is preferably less than 3.5 and is e.g. on the order of magnitude of 0.25.

The other joining parameters in connection with the design of the surface profiling 28f are selected such that the nail 6f is driven through the two components 2, 4 during the joining process, without the nail 6f carrying out a noticeable rotational movement. As in the exemplary embodiments described above, the thread pitches of the surface profiling 28f fill with plasticized material. This forms a counter thread to the components 2, 4. The nail 6f can thus be released from the two components 2, 4 again after the setting process. For this purpose, the nail head 8f is provided with a drive characteristic 46, so that the nail 6f can be screwed out of the components with the help of a tool (not shown).

Figure 11:
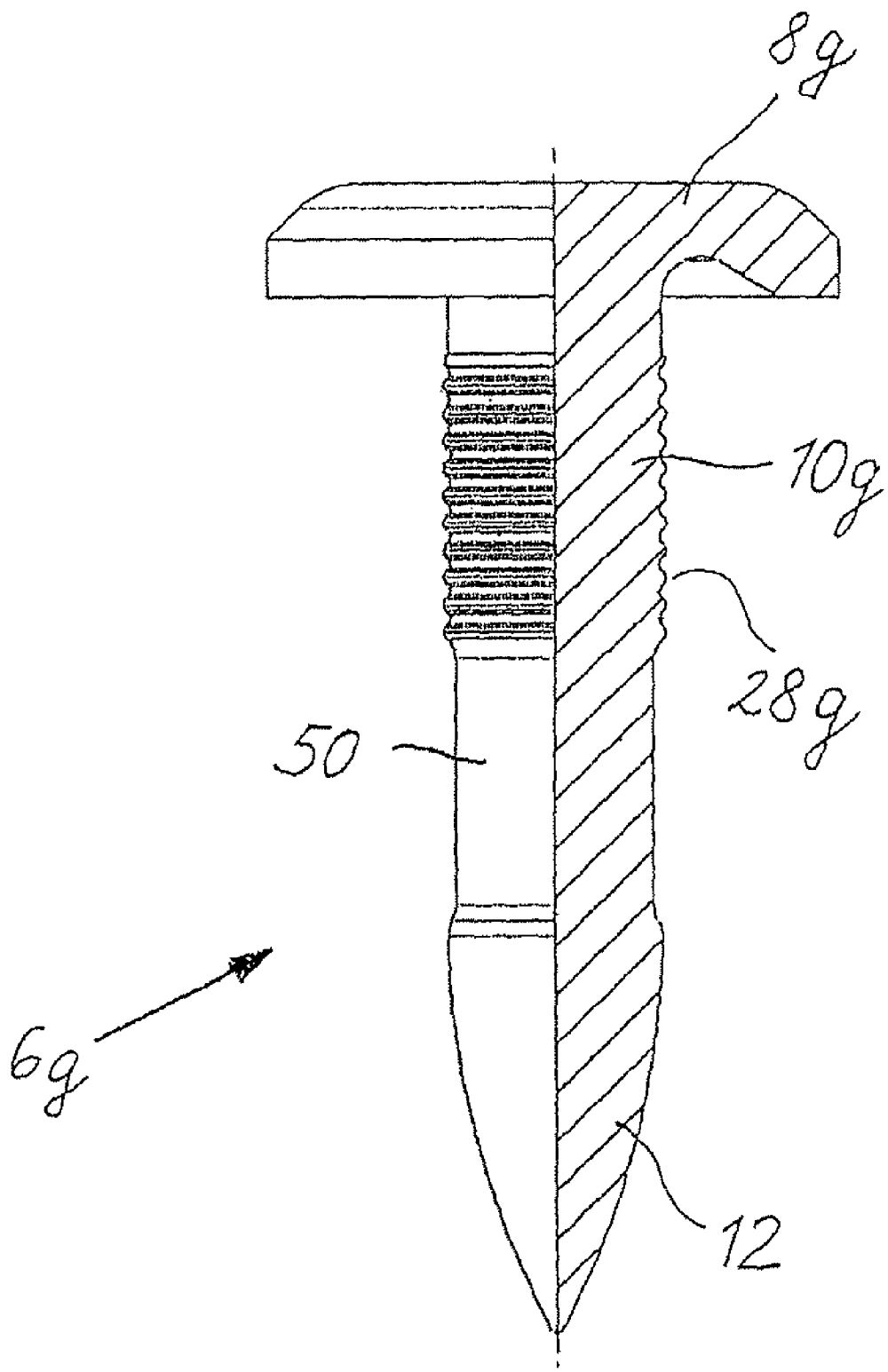
FIG. 11 shows a partially cut view of another embodiment of the nail according to the invention.

The nail 6g in FIG. 11 mainly matches the nail 6b in FIG. 4, i.e. it has a nail head 8g, a nail shaft 10g with a surface profiling 28g, a nail tip 12 and a non-profiled section 50, which is arranged between the nail tip 12 and the part of the nail shaft 10g provided with the surface profiling 28g. However, in contrast to the exemplary embodiment in FIG. 4, the profile-free section 50 has a tapered shaped, i.e. its diameter is smaller than the maximum diameter of the nail tip 12 and than the diameter of the part of the nail shaft provided with the surface profiling 28g. In the exemplary embodiment shown, the reduced diameter section 50 is designed cylindrically; however, it could in general also have a different geometric shape.

Based on the diameter reduction of the section 50, a pressure reduction results when the nail 8$g$ enters the components 2, 4 as soon as the nail tip 12 has completely entered the material of the components. This pressure reduction results in less deformation of the components 2, 4 and thus higher connection capabilities.

The described process for setting the nail is used particularly advantageously in connection with a gluing of the components 2, 4. In the case of this hybrid joining technique, the components 2, 4 are also connected together on their adjacent surfaces through an adhesive, whereby an extremely high-strength and uniform connection is established between the components 2, 4. Any conventional adhesive, a large variety of which are known from the state of the art, can be used.

One important advantage of the method described is that only a very short setting duration is required for the setting of a nail. Furthermore, the method, as already explained in detail, can be performed without prepunching and with only one-sided accessibility of the components. These advantageous properties make the described method particularly suitable for "continuous nailing," as explained below:

Two components must often be connected together at several spaced joining locations, for example along joining flanges. In the case of convention mechanical joining processes, the setting device is then moved successively by a robot to the joining locations. The setting device is first stopped at each joining location, the joining process is performed and the setting device is accelerated again. This naturally leads to comparatively long cycle times. Thus, the punch riveting, clinching, blind riveting and nailing joining techniques require cycle times of 2-7 s, 2-6.5 s, 3-7.5 s or 3-8 s when using the initially described FDS method.

In contrast to the described discontinuous joining of the components at the joining locations, the method according to the invention allows a "continuous joining." More exactly, the movement of the setting device created by the robot from joining location to joining location is continuous, wherein the nails are set during this feed motion in accordance with the method described above. The components are advantageously held in the correct position with respect to each other during the continuous flow of this joining process by corresponding tensioning devices. The only prerequisite is that the joining locations for the setting device are accessible. This is often the case when the joining locations are located on joining flanges.

The continuous nailing is facilitated in that a precise control of the joining locations is not generally required for the setting of the nail according to the described method. The feed motion of the setting device performed by the robot can take place in a contact-free manner. However, instead of this, a mouthpiece provided on the setting device (hold-down device 44 in FIG. 1) can rest against the upper component 2.

In each case, the cycle times are considerably reduced since no braking and acceleration processes are required by the robot and shorter setting times are also achieved than in the case of conventional mechanical joining processes. Thus, cycle times on the order of magnitude of 1.5-3 s are possible with the described process, which reduces the cycle time by approx. 50%.

As already explained in connection with FIG. 1, it is advantageous to push together the components 2, 4 to be connected during the bolt setting by means of a hold-down device, whereby hold-down forces on the order of magnitude of up to 20 kN are conceivable. The hold-down device normally forms part of the setting device. A continuous nailing, as described above, is then not possible in the case of the use of a hold-down device. However, instead of a hold-down device, a stationary gripping mechanism (not shown) can also be provided, which pushes the two components against each other with a corresponding force independently of the setting device and at locations outside of the joining areas. In this case, a continuous nailing is then possible in that the setting device is operated in a non-contact manner, whereby only a driving spike of the setting device has contact with the components to be connected via the nail and the mouthpiece of the setting device is thus, in a manner of speaking, "floated" over the nail-head-side component.

FIGS. 12 and 13 show another embodiment of a nail 6$h$ designed according to the invention. The shaft 10$h$ with its sawtooth profile 28$h$ and the nail tip 12 of the nail 6$h$ mainly match the nail shown in FIG. 7. As in FIG. 7, the sawtooth profile 22$h$ is also aligned here such that each tooth is tapered in the direction of the nail tip 12. The difference is that the nail head 8$h$ is designed as a countersunk head.

The nail head 8$h$ of nail 6$h$ has on its bottom side a diagonally running section 52, which transitions into a circular groove 22$h$. The circular groove 22$h$, which lies between the diagonally running section 52 and a cylindrical section of the shaft 10$h$, has very small dimensions compared to the diagonally running section 52. The diagonally running section 52 is preferably slightly curved, in order to ensure an even force distribution between the nail head 8$h$ and the top side of the component 2. The nail head 8$h$ designed as a countersunk head also has a considerably smaller thickness than the nail heads in the previous exemplary embodiments.

Based on the described geometry, the countersunk head of the nail 6$h$ enters at least partially the top side of the component 2. More exactly, the nail head 8$h$ deforms the upper component 2 such that a funnel-like depression 54 is formed, which largely receives the nail head 8$h$. Moreover, the components 2, 4 in the joining area, i.e. below the countersunk head, are deformed downwards so that a funnel-like progression can also be observed in the contact area between the two components 2, 4.

In particular when the nail-head-side component 2 is made of steel, there is a comparatively small material bulge 38$h$, which only partially fills the circular groove 22$h$, on its top side. Please note here that the connection in the case of the previous exemplary embodiments can also be designed such that the material bulge 38 only partially fills the circular groove 22 in contrast to the illustration in FIG. 1.

FIGS. 14, 15 show an embodiment of the invention, in which the nail 6$i$ is designed as a "staple bolt." It serves to "staple" a relatively thin component 2 to a thicker component 4. This embodiment is used in particular in connection with an adhesive connection of the components 2, 4, between which an adhesive layer 62 is provided. The component 2 is hereby stapled by one or more staple bolts on the component 4, so that the adhesive layer 62 can harden.

The nail 6$i$ designed as a staple bolt has a nail head 8 with a circular groove 22 according to the exemplary embodiments in FIGS. 1 through 8. The shaft 10$i$ of the nail 6$i$ is designed such that a cylindrical section 56 is connected to the nail head 8, which crosses over into a conically tapering shaft section with a sawtooth profiling 28$i$. The sawtooth profiling 28$i$ is aligned such that each tooth is tapered in the direction of the nail tip 12$i$ so that a radially progressing should surface is formed on the side of each tooth facing towards the nail head 8. The nail tip 12$i$ connected to the sawtooth profiling 28$i$ is made up of a truncated-cone-shaped section 58 and an apexlike section 60, wherein the cone angle of the section 58 is less than the cone angle of the section 60.

Even if the nail tip 12i in the exemplary embodiment shown is made up of the two sections 58, 60 with different cone angles, the nail tip can also be designed in a different manner, for example as an ogival nail tip according to the previous exemplary embodiments. The tapering of the nail tip and the nail shaft in the area of the sawtooth profiling 28i is important.

Similar to FIG. 1, FIG. 14 in turn shows a hold-down device 44 and a counterholder in the form of a sleeve 46.

The nail 6i designed as a staple bolt has considerably smaller dimensions than the previous embodiments of the invention. Thus, the staple bolt has for example a length on the order of magnitude of 6 mm. Based on the depicted illustration of the nail shaft 10i and the nail tip 12i, the intended sleeve end of the sawtooth profiling 28i has a shape, which is almost the same as the shape of a parabola in axial cuts, in connection with the profile of the nail tip 12i.

The geometry of the nail shaft 10i and the nail tip 12i and in particular the alignment of the surface profiling 28i ensure that the nail 6i can be driven into the components 2, 4 by the piston 42 (driving spike) of the otherwise unshown setting device with comparatively low drive-in force, while the extraction resistance against the drive-in direction is relatively high due to the shoulder-like surfaces between the teeth of the sawtooth profiling 28i. An important advantage of the nail 6i designed as a staple bolt is that it hardly has an effect on the adhesive layer 62 during the "stapling process." As shown in experiments, the thickness of the adhesive layer 62 is the same before and after the stapling process.

In the case of the connection shown in FIG. 14, the nail head 12i protrudes largely over the crater-shaped material bulge 40 of the component 4. However, the nail 6i and the components 2, 4 are preferably dimensioned such that the free end of the nail tip 12i only protrudes slightly or not at all from the component 4. A solution in which the free end of the nail tip 12i just closes the bottom end of the material bulge 40 is also conceivable.

As already mentioned, an important advantage of the method according to the invention is that the nail can be driven into the two components 2, 4 with one single blow from the bolt setting device, so that the nail head rests on the nail-head-side component. This applies to all embodiments shown. However, it is also generally possible to perform the setting process such that the nail is not driven all the way into the components by a blow delivered from the setting device, but rather only e.g. 80% to 90% of the maximum possible drive-in path. The rest of the driving in of the nail up to the head can then take place with one or more additional blows. These additional blows can either be performed manually with a hammer or via a driving spike or also automatically. As determined in experiments, this "multi-stage" bolt setting does not have a negative impact on the stability of the connection, which applies to both components made of aluminium and components made of steel.

We claim:

1. A method for establishing a connection between two non-prepunched components including a nail-head-side component facing a nail head and a non-nail-head side component facing away from the nail head, in a joining area by a nail having a nail head with a circular groove provided on a bottom side of the head, a nail shaft, and a nail tip, comprising:

driving the nail substantially free of rotation and axially into the non-prepunched components in the joining area at a high speed by a setting device, such that the nail tip fully penetrates the components and escapes over the non-nail-head side component;

forming a toric-shaped material bulge in the nail-head-side component, which protrudes into the circular groove; and forming a crater-shaped material bulge in the non-nail-head side component, which protrudes in a direction facing away from the nail head.

2. The method according to claim 1, wherein a volume of the circular groove is substantially equal to a volume of the material bulge of the nail-head-side component.

3. The method according to claim 1, wherein the circular groove has a rounded surface adjacent atoll the nail shaft.

4. The method according to claim 1, wherein the nail shaft is substantially cylindrical in shape.

5. The method according to claim 1, wherein the nail shaft tapers in a direction facing the nail head.

6. The method according to claim 1, wherein the nail shaft tapers away from a direction of the nail head.

7. The method according to claim 1, wherein the nail shaft includes a surface profiling that fills with displaced material during the establishing of the connection.

8. The method according to claim 7, wherein the surface profiling is arranged only in one area of the nail shaft, the one area being in finished connection within the non-nail-head side component.

9. The method according to claim 7, wherein a ratio of a maximum depth of the surface profiling to an average diameter of the nail shaft is less than 0.1.

10. The method according to claim 7, wherein the surface profiling in axial sections includes a wave-shaped profile.

11. The method according to claim 7, wherein the surface profiling in axial sections includes a sawtooth-shaped profile.

12. The method according to claim 7, wherein the surface profiling includes a series of circular recesses and ridges.

13. The method according to claim 7, wherein the surface profiling includes a thread, which forms forming a corresponding counter thread during the axial driving of the nail into the components.

14. The method according to claim 13, wherein an incline of the thread formed by the surface profiling is less than 0.35 mm/T.

15. The method according to claim 13, wherein the nail head has a drive characteristic for the engagement of a tool, in order to be able to release the nail from the two components again.

16. The method according to claim 1, further comprising providing a profile-free section between a part of the nail shaft provided with a surface profiling and the nail tip.

17. The method according to claim 16, further comprising providing a reduced diameter section between the part of the nail shaft provided with a surface profiling and the nail tip.

18. The method according to claim 1, wherein a top of the nail head is substantially even up to an outer edge of the top of the nail head in order to substantially transfer setting forces exerted on the nail head in an end position of the nail to the nail-head-side component and thereby avoid a penetration of the nail head through the two components.

19. The method according to claim 1, wherein the nail tip has an ogival form with an ogivality factor of 3 to 5.

20. Method according to claim 1, wherein the nail is composed of a single piece of one member selected from the group consisting of steel, aluminium, and magnesium, with a different hardness.

21. The method according to claim 1, wherein the shaft and the head of the nail are composed of materials with different hardnesses.

22. The method according to claim 1, wherein the nail-head-side component is a substantially thin sheet metal plate and the non-nail-head-side component includes a profile component with a thickness larger than a thickness of the sheet metal plate.

23. The method according to claim 1, wherein the components are composed of at least one member selected from the group consisting of steel, aluminum, magnesium, and plastic.

24. The method according to claim 1, wherein the two components are coupled together by adhesive.

25. A method for establishing connections between two components at a plurality of locations comprising:
 moving a setting device successively to the locations, wherein the movement of the setting device to the locations is performed by a robot and occurs continuously; and
 driving the nails into the two components with a method according to claim 1 during the step of moving.

26. The method according to claim 1, wherein the nail head includes a countersunk head, the bottom side of the countersunk head having a diagonally running section and a small circular groove across from the bottom side.

27. The method according to claim 1, further comprising pushing the components against each other with a hold-down device provided on the setting device or a gripping mechanism that is separate from the setting device.

28. The method according to claim 1, wherein the nail is driven into the two components with a single blow of the setting device.

29. The method according to claim 1, wherein the nail is substantially driven into the two components with a blow of the setting device and is driven completely into the two components with one or more additional blows, which are performed manually or mechanically.

* * * * *